US009404788B2

(12) United States Patent
Tanabe et al.

(10) Patent No.: US 9,404,788 B2
(45) Date of Patent: Aug. 2, 2016

(54) SYSTEM OF VERIFYING OPERATION OF ELECTROMAGNETIC FLOW METER

(71) Applicant: YOKOGAWA ELECTRIC CORPORATION, Musashino-shi, Tokyo (JP)

(72) Inventors: Seiji Tanabe, Musashino (JP); Norio Yasuda, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 354 days.

(21) Appl. No.: 13/926,012

(22) Filed: Jun. 25, 2013

(65) Prior Publication Data

US 2013/0340498 A1 Dec. 26, 2013

(30) Foreign Application Priority Data

Jun. 26, 2012 (JP) .................................. 2012-142989

(51) Int. Cl.
*G01F 1/58* (2006.01)
*G01F 25/00* (2006.01)

(52) U.S. Cl.
CPC .............. *G01F 25/0007* (2013.01); *G01F 1/58* (2013.01)

(58) Field of Classification Search
CPC ........... G01F 1/58; G01F 1/588; G01F 1/584; G01F 1/586; G01F 25/0007
See application file for complete search history.

(56) References Cited

U.S. PATENT DOCUMENTS

| | | | | |
|---|---|---|---|---|
| 3,191,436 A | * | 6/1965 | Davis ......................... | 73/861.11 |
| 3,996,797 A | * | 12/1976 | Torimaru et al. .......... | 73/861.16 |
| 4,059,014 A | * | 11/1977 | Torimaru ................... | 73/861.16 |
| 4,969,363 A | * | 11/1990 | Mochizuki ................. | 73/861.17 |
| 5,289,725 A | * | 3/1994 | Brown ....................... | 73/861.12 |
| 5,469,746 A | * | 11/1995 | Fukunaga et al. ......... | 73/861.12 |
| 5,602,346 A | * | 2/1997 | Kitami et al. .......... | 73/861.356 |
| 7,750,642 B2 | | 7/2010 | Graber et al. | |
| 2003/0005777 A1 | * | 1/2003 | Budmiger ................. | 73/861.12 |
| 2003/0051557 A1 | * | 3/2003 | Ishikawa et al. .......... | 73/861.12 |
| 2004/0015302 A1 | * | 1/2004 | Suzuki et al. .................... | 702/38 |
| 2004/0123670 A1 | * | 7/2004 | Nakatani et al. ........... | 73/861.12 |
| 2004/0200259 A1 | * | 10/2004 | Mattar ........................... | 73/1.34 |
| 2005/0075803 A1 | * | 4/2005 | Budmiger et al. .............. | 702/45 |
| 2007/0010968 A1 | * | 1/2007 | Longsdorf ............. | G08C 19/02 702/183 |
| 2008/0282766 A1 | * | 11/2008 | Ishikawa et al. ............... | 73/1.88 |
| 2012/0031196 A1 | * | 2/2012 | Matzen ...................... | 73/861.12 |

FOREIGN PATENT DOCUMENTS

| | | | |
|---|---|---|---|
| CN | 101517377 A | 8/2009 | |
| CN | 202117824 U * | 1/2012 | |
| EP | 2372317 A1 * | 10/2011 | |
| GB | 2371869 A * | 8/2002 | ............... G01F 1/60 |
| JP | 10-213466 A | 8/1998 | |
| JP | 2003214919 A * | 7/2003 | ............... G01F 1/60 |
| JP | 2004-354205 A | 12/2004 | |
| JP | 2009288088 A * | 12/2009 | |
| WO | 2012/066372 A1 | 5/2012 | |

* cited by examiner

*Primary Examiner* — David A Rogers
(74) *Attorney, Agent, or Firm* — Sughrue Mion, PLLC

(57) ABSTRACT

A system of verifying an operation of an electromagnetic flow meter, includes a plurality of comparing modules configured to compare a plurality of parameters respectively obtained from modules of the electromagnetic flow meter with threshold values respectively, to output compared results, and a determining module configured to determine in real time an operation state of a block in the electromagnetic flow meter based on at least one of the compared results output from the plurality of comparing modules.

7 Claims, 5 Drawing Sheets

FIG. 3

<CONDITION: COMMON TO FLOW/NO FLOW>

| COMBINATION OF PARAMETERS / LIST OF RESULTS OF MODULES | COMBINATION NUMBER OF PARAMETERS | | |
|---|---|---|---|
| | #1 | #2 | #3 |
| COMPARED RESULT OF ZERO ADJUSTMENT VALUE | - - | - - | THE OTHERS |
| COMPARED RESULT OF ELECTRODE POTENTIAL | - - | - - | |
| COMPARED RESULT ELECTRODE WETTED PORTION RESISTANCE VALUE | - - | - - | |
| COMPARED RESULT OF EXCITING CURRENT VALUE | OK | NG | |
| COMPARED RESULT OF INTERNAL INTEGRATED VALUE | - - | - - | |
| DETERMINED RESULT OF EXCITING BLOCK | ACCEPTANCE | REJECTION | NOT DETERMINED |

FIG. 4

<CONDITION: NO FLOW>

| COMBINATION OF PARAMETERS / LIST OF RESULTS OF MODULES | COMBINATION NUMBER OF PARAMETERS | | |
|---|---|---|---|
| | #1 | #2 | #3 |
| COMPARED RESULT OF ZERO ADJUSTMENT VALUE | OK | NG | THE OTHERS |
| COMPARED RESULT OF ELECTRODE POTENTIAL | OK | OK | |
| COMPARED RESULT ELECTRODE WETTED PORTION RESISTANCE VALUE | OK | OK | |
| COMPARED RESULT OF EXCITING CURRENT VALUE | OK | NG | |
| COMPARED RESULT OF INTERNAL INTEGRATED VALUE | -- | -- | |
| DETERMINED RESULT OF MAGNETIC CIRCUIT BLOCK | ACCEPTANCE | REJECTION | NOT DETERMINED |

FIG. 5

<CONDITION: FLOW>

| COMBINATION OF PARAMETERS / LIST OF RESULTS OF MODULES | COMBINATION NUMBER OF PARAMETERS | | |
|---|---|---|---|
| | #1 | #2 | #3 |
| COMPARED RESULT OF ZERO ADJUSTMENT VALUE | -- | -- | THE OTHERS |
| COMPARED RESULT OF ELECTRODE POTENTIAL | OK | OK | |
| COMPARED RESULT ELECTRODE WETTED PORTION RESISTANCE VALUE | OK | OK | |
| COMPARED RESULT OF EXCITING CURRENT VALUE | OK | OK | |
| COMPARED RESULT OF INTERNAL INTEGRATED VALUE | OK | NG | |
| DETERMINED RESULT OF FLOW RATE CALCULATING BLOCK | ACCEPTANCE | REJECTION | NOT DETERMINED |

SYSTEM OF VERIFYING OPERATION OF ELECTROMAGNETIC FLOW METER

CROSS-REFERENCE TO RELATED APPLICATION(S)

The present application claims the benefit of priority of Japanese Patent Application No. 2012-142989, filed on Jun. 26, 2012. The disclosures of the application are incorporated herein by reference.

BACKGROUND

1. Technical Field

The present disclosure relate to a system of verifying an operation of an electromagnetic flow meter, and more particularly to a system which can verify an operation state of the electromagnetic flow meter mounted in a pipe conduit in real time.

2. Related Art

The electromagnetic flow meter is formed in such a way that an exciting current is supplied to an exciting coil provided in the flow meter to generate a magnetic field in a pipe, and then, fluid is allowed to flow in the magnetic field so that an electromotive force proportional to a flow velocity generated in accordance with the Faraday's electromagnetic induction law is detected in an electrode to obtain a flow rate of the fluid in accordance with the electromotive force detected in the electrode. In a variety of fields including water and sewage works, food, a petroleum refining, chemicals, etc., are used various kinds of sizes from a micro-aperture to a large aperture that meet uses for measurement.

In such an electromagnetic flow meter, as forms of troubles in which the flow rate cannot be normally measured, a plurality of causes as described below are considered.

For instance, when an insulating material adheres to the electrode, an oscillation may sometimes appear in an output, or hunting or an overshooting of an instruction may occur, so that it is impossible to carry out a stable measurement of the flow rate.

Further, due to the trouble of an electric circuit, an excitation cannot be occasionally carried out, a calculating process cannot be carried out or a measured result is not displayed.

Further, when a mechanically attached position of the exciting coil shifts or floats from a predetermined position due to the cause that an attaching screw of the exiting coil forming a magnetic circuit is unfastened or falls as well as the adhesion of the insulating material to the electrode or the trouble of the electric circuit, a balancing property of a magnetic flux distribution is broken so that a measurement operation is abnormal.

Thus, for instance, the patent literature 1 proposes a system of monitoring an abnormal state such as fluid to be measured which has an electric conductivity exceeding a range of a specification or an adhesion of a foreign material to an electrode.

Further, when an abnormality arises in an exciting system of an exciting coil, for instance, the patent literature 2 proposes a unit of self-diagnosing that the abnormality is a trouble of either an over-excitation or an under-excitation of an exciting circuit.

LITERATURE OF RELATED ART

Patent Literature

[Patent Literature 1] JP-A-10-213466
[Patent Literature 2] JP-A-2004-354205

However, as for a presence or an absence of the trouble of the magnetic circuit, the balancing property of the magnetic flux distribution needs to be recognized by using a magnetic flux measuring device or the electromagnetic flow meter needs to be detached from the pipe conduit and disintegrated so as to visually observe and recognize the attaching state of the exciting coil. Thus, the recognition is extremely hardly carried out in real time.

SUMMARY

Exemplary embodiments of the invention provide a system of verifying an operation of an electromagnetic flow meter which can verify in real time an acceptance or rejection of an operation of each module of an electromagnetic flow meter including a presence or absence of a trouble of a magnetic circuit as required.

A system of verifying an operation of an electromagnetic flow meter, according to an exemplary embodiment, comprises:

a plurality of comparing modules configured to compare a plurality of parameters respectively obtained from modules of the electromagnetic flow meter with threshold values respectively, to output compared results; and a determining module configured to determine in real time an operation state of a block in the electromagnetic flow meter based on at least one of the compared results output from the plurality of comparing modules.

The determining module may be configured to determine in real time the operation state of the block in the electromagnetic flow meter based on combination of the compared results output from the plurality of comparing modules.

The plurality of parameters may include a zero adjustment value, an electrode potential, an electrode wetted portion resistance value, an exciting current value and an integrated value.

The block may include any of an exciting block, a magnetic circuit block and a calculating process block.

The electromagnetic flow meter may be a double frequency excitation system.

According to the exemplary embodiment, it is possible to verify in real time an acceptance or rejection of an operation of each module of an electromagnetic flow meter including a magnetic circuit block.

BRIEF DESCRIPTION OF THE DRAWINGS

FIG. 3 is a parameter combination diagram for verifying an exciting block operation.

FIG. 4 is a parameter combination diagram for verifying a magnetic circuit block operation.

FIG. 5 is a parameter combination diagram for verifying a flow rate calculating block operation.

DETAILED DESCRIPTION

Figure 1:
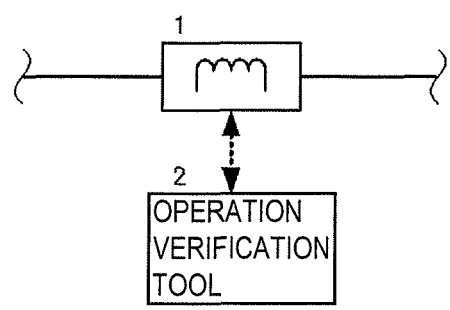
FIG. 1 is a basic structural view of the present invention.

Now, an exemplary embodiment of the present invention will be described below by referring to the drawings. FIG. 1 is a basic structural view of the present invention. An electromagnetic flow meter 1 includes a plurality of blocks as objects to be verified such as an exciting block, a magnetic circuit block, a flow rate calculating block or the like. The electromagnetic flow meter 1 is mounted and arranged in a pipe conduit in which fluid as an object to be measured is allowed to flow.

An operation verification tool 2 is connected to the electromagnetic flow meter 1 arranged in the pipe conduit through, for instance, a connector. Then, the operation verification tool 2 carries out in real time a process of verifying operations of the predetermined blocks as the objects to be verified which form the electromagnetic flow meter 1 in accordance with a plurality of parameters obtained respectively from modules of the electromagnetic flow meter 1.

Figure 2:
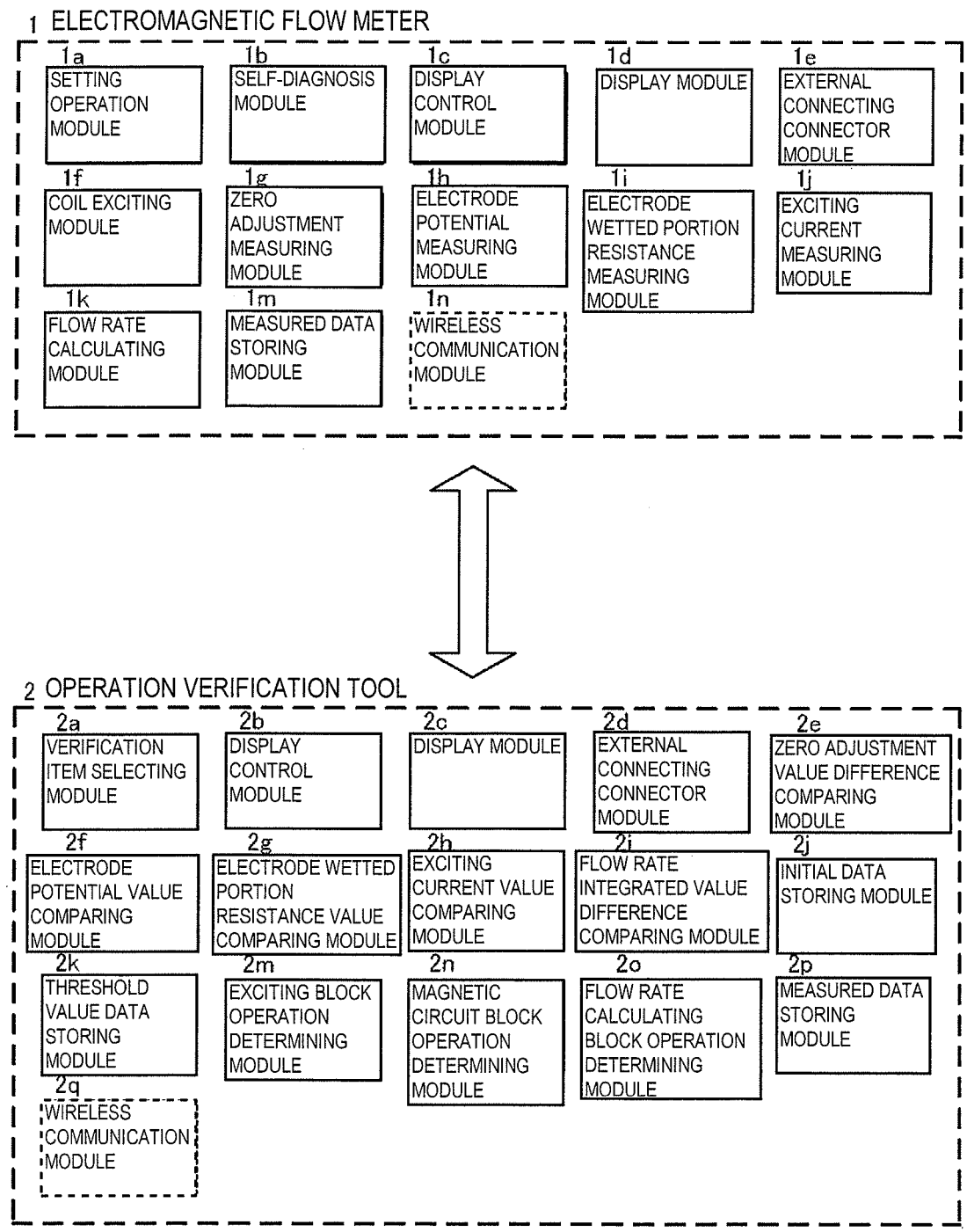
FIG. 2 is a block diagram showing an exemplary embodiment of the present invention.

FIG. 2 is a block diagram showing a specific structural example of the modules of the electromagnetic flow meter 1 and operation verification tool 2 respectively shown in FIG. 1 according to the exemplary embodiment of the present invention.

In the electromagnetic flow meter 1, an operator reads and recognizes various kinds of information displayed on a display screen of a display module 1*d* in an installation site to carry out a setting operation necessary for a purpose such as a selection of a display item, a measure for an occurrence of an alarm or the like through a setting operation module 1*a*.

A self-diagnosis module 1*b* carries out a diagnosis of an adhesion of a foreign material to an electrode, a diagnosis of an emptiness of a pipe to be measured or a diagnosis of a disconnection of a coil.

A display control module 1*c* drives and controls the display module 1*d* to display various kinds of information including various kinds of flow rate measured values such as an instantaneous flow rate, an instantaneous flow rate %, an integrated value or the like, and including a display of a bar graph, a display of an alarm during an occurrence of the alarm or a method of taking measure for the occurrence of the alarm.

An external connecting connector module 1*e* serves to connect an external device such as the operation verification tool 2 as required to send and receive the plurality of parameters obtained respectively from the modules of the electromagnetic flow meter between the external device and the external connecting connector module.

A coil exciting module 1*f* excites an exciting coil not shown in the drawing by, for instance, a double frequency exciting signal obtained by superimposing a high frequency on a low frequency. When such an excitation is carried out, a noise resistance and high speed responsiveness for a high frequency excitation can be obtained and a stability of a zero point for a low frequency excitation can be also realized.

A zero adjustment measuring module 1*g* measures an adjustment value at the time of a flow rate of zero under a full water state to store a measured result in a measured data storing module 1*m*.

An electrode potential measuring module 1*h* measures a potential difference between detecting electrodes not shown in the drawing under the full water state to store a measure result in the measured data storing module 1*m*.

An electrode wetted portion resistance measuring module 1*i* measures a resistance value in a wetted portion of the detecting electrode under the full water state to store a measured result in the measured data storing module 1*m*.

An exciting current measuring module 1*j* measures an exciting current value supplied to the exciting coil to store a measured result in the measured data storing module 1*m*.

When it is assumed that a magnetic flux density generated by the exciting coil is B, a diameter of a pipe conduit through which the fluid flows is D and a flow velocity of fluid is v, a flow rate calculating module 1*k* calculates the flow rate Q in accordance with a measurement principle that an electromotive force E proportional to the flow velocity v is generated which is expressed by a below-described equation to store a calculated result in the measured data storing module 1*m*. In the case of a double frequency excitation system, the flow rates are calculated respectively for the low frequency excitation and the high frequency excitation to store integrated values thereof for a predetermined time respectively in the measured data storing module 1*m*.

$$E = \alpha \cdot B \cdot v \cdot D$$

$$Q = k \cdot v = k' \cdot E$$

As described above, the measured data storing module 1*m* stores the measured results or the calculated results respectively in the modules one by one.

In the operation verification tool 2, the operator reads and recognizes various kinds of information displayed on a display screen of a display module 2*c* in the installation site of the electromagnetic flow meter 1 as required to select and designate which of the blocks as the objects to be verified of the electromagnetic flow meter 1 is to be verified through a verification item selecting module 2*a*.

A display control module 2*b* drives and controls the display module 2*c* to display the various kinds of information relating to a series of verifying processes.

An external connecting connector module 2*d* is connected to the external connecting connector module 1*e* of the electromagnetic flow meter 1 to verify the operation of the block as the objects to be verified of the electromagnetic flow meter 1. Thus, the external connecting connector module 2*d* sends and receives various data such as the plurality of parameters respectively obtained from the modules of the electromagnetic flow meter 1.

A zero adjustment value difference comparing module 2*e* calculates a difference between a parameter during the verification at the last time and a present parameter to compare the difference with data of threshold value and stores a compared result (OK/NG) in a measured data storing module 2*p*. For example, the compared result (OK/NG) includes the information indicating that the calculated value is an appropriate value (OK) or is not appropriate value (NG).

An electrode potential value comparing module 2*f* calculates an electrode potential value to compare the electrode potential value with a predetermined threshold value previously set and stored in a threshold value data storing module 2*k* and stores a compared result (OK/NG) in the measured data storing module 2*p*.

An electrode wetted portion resistance value comparing module 2*g* calculates an resistance value of a wetted portion of an electrode to compare the electrode wetted portion resistance value with a predetermined threshold value previously set and stored in the threshold value data storing module 2*k* and stores a compared result (OK/NG) in the measured data storing module 2*p*.

An exciting current value comparing module 2*h* calculates an exciting current value to compare the exciting current value with a previous threshold value previously set and stored in the threshold value data storing module 2*k* and stores a compared result (OK/NG) in the measured data storing module 2*p*.

A flow rate integrated value difference comparing module 2*i* compares a difference of the integrated values respectively of the low frequency excitation and the high frequency excitation for the predetermined time which are fetched from the electromagnetic flow meter 1 as the parameters with a predetermined threshold value previously set and stored in the threshold value data storing module 2*k* and stores a compared result (OK/NG) in the measured data storing module 2*p*.

To an initial data storing module 2j, initial data at the time of a shipment from a factory which is the parameter peculiar to the electromagnetic flow meter 1 as the object to be verified and data during an verification of the last time are transferred and stored. In accordance with these data, for instance, a level of an aging change of a zero adjustment value can be obtained.

When it is assumed that an aperture of the electromagnetic flow meter 1 is, for instance, 25 mm, the threshold values respectively stored in the threshold value data storing module 2k are set to values as described below.

a) Zero adjustment value: a low frequency 1 cm/s, a high frequency 5 cm/s that depends on the aperture of the electromagnetic flow meter 1 and a structure of a magnetic circuit or the like.

b) Electrode potential value: 0.5V (=|A electrode potential (1V)–B electrode potential (1V)|)
that depends on an electrode structure of the electromagnetic flow meter 1 and a size of an electrode or the like.

c) Electrode wetted portion resistance value: 3 MΩ
that depends on the electrode structure of the electromagnetic flow meter 1 and the size of the electrode or the like.

d) Exciting current value: 200 to 400 mA
that depends on the size and the structure of the exciting coil of electromagnetic flow meter 1.

e) Flow rate integrated value difference: |low frequency integrated value–high frequency integrated value|*25%
that depends on actually measured data of a flow rate and an aging change or the like.

An exciting block operation determining module 2m determines, as shown in a parameter combination diagram in FIG. 3, an acceptance or a rejection of exciting block operations as described below in accordance with the exciting current value compared result of the exciting current value comparing module 2h irrespective of a presence or an absence of the flow of fluid. In other words, the exciting block operation determining module 2m determines that the operation of the exciting block is normal (acceptance) or is not normal (rejection).

1. Exciting current value compared result: OK
→→→Determined result of exciting block operation: Acceptance

2. Exciting current value compared result: NG
→→→Determined result of exciting block operation: Rejection

3. Exciting current value compared result: the others
→→→Determined result of exciting block operation: Not determined A magnetic circuit block operation determining module 2n determines, as shown in a parameter combination diagram in FIG. 4, an acceptance or a rejection of magnetic circuit block operations as described below in accordance with the zero adjustment value difference compared result of the zero adjustment value difference comparing module 2e, the electrode potential value compared result of the electrode potential value comparing module 2f, the electrode wetted portion resistance value compared result of the electrode wetted portion resistance value comparing module 2g and the exciting current value compared result of the exciting current value comparing module 2h under a state that the fluid stands still.

1. Zero adjustment value difference compared result: OK
Electrode potential value compared result: OK
Electrode wetted portion resistance value compared result: OK
Exciting current value compared result: OK
→→→Determined result of magnetic circuit block operation: Acceptance

2. Zero adjustment value difference compared result: NG
Electrode potential value compared result: OK
Electrode wetted portion resistance value compared result: OK
Exciting current value compared result: OK
→→→Determined result of magnetic circuit block operation: Rejection

3. Zero adjustment value difference compared result: the others
Electrode potential value compared result: the others
Electrode wetted portion resistance value compared result: the others
Exciting current value compared result: the others
→→→Determined result of magnetic circuit block operation: Not determined A flow rate calculating block operation determining module 2o determines, as shown in a parameter combination diagram in FIG. 5, an acceptance or a rejection of flow rate calculating block operations as described below in accordance with the electrode potential value compared result of the electrode potential value comparing module 2f, the electrode wetted portion resistance value compared result of the electrode wetted portion resistance value comparing module 2g, the exciting current value compared result of the exciting current value comparing module 2h and the flow rate integrated value difference compared result of the flow rate integrated value difference comparing module 2i under a state that the fluid flows.

1. Electrode potential value compared result: OK
Electrode wetted portion resistance value compared result: OK
Exciting current value compared result: OK
Flow rate integrated value difference compared result: OK
→→→Determined result of flow rate calculating block operation: Acceptance

2. Electrode potential value compared result: OK
Electrode wetted portion resistance value compared result: OK
Exciting current value compared result: OK
Flow rate integrated value difference compared result: NG
→→→Determined result of flow rate calculating block operation: Rejection

3. Electrode potential value compared result: the others
Electrode wetted portion resistance value compared result: the others
Exciting current value compared result: the others
Flow rate integrated value difference compared result: the others
→→→Determined result of flow rate calculating block operation: Not determined Under a state that the operation of an exciting block is normal, the electrode potential or the electrode wetted portion resistance value is also shifted when the zero adjustment value is shifted due to the adhesion of the foreign material to the electrode, the emptiness of the pipe to be measured or a large fluid noise.

As compared therewith, for instance, when the magnetic circuit is broken and the operation of the magnetic circuit is abnormal, the balancing property of the magnetic flux distribution is broken. Accordingly, the zero adjustment value is merely shifted from the initial data at the time of the shipment from the factory or the data during the verification of the last time, and the electrode potential or the electrode wetted portion resistance value is not shifted.

Thus, in the operation verification tool 2, combinations of logics suitable for determining the operation states of the block as shown by the combination diagrams in FIG. 3 to FIG.

5 are respectively realized by hardware or software programs in association with the selecting operation of the verification item selecting module 2, so that the display module 2c is allowed to automatically display and output the determined results of the acceptance or the rejection.

According to such a structure, the threshold values of the comparing modules are respectively changed depending on kinds of devices as objects to be verified. Thus, other kinds of devices of the electromagnetic flow meters may be developed.

Further, when a trend (the aging change) of measured data is managed, a more highly accurate verification can be carried out.

Further, in the above-described exemplary embodiment, the example is described in which the electromagnetic flow meter 1 is connected to the operation verification tool 2 through their external connecting connectors 1e and 2d, respectively. However, wireless communication modules 1n and 2q may be respectively provided in the electromagnetic flow meter 1 and the operation verification tool 2 to connect them to each other through a wireless transmission line, or the operation verification tool may be built in the flow meter.

As forms which realizes the operation verification tool 2, various kinds of forms can be realized, for instance, software built in a personal computer, hardware logic or software built in a hand held terminal as a single device, hardware logic or software built in an operating terminal of a decentralized control system (DCS), etc.

As described above, according to the present invention, the system of verifying the operation of the electromagnetic flow meter can be realized which can verify in real time the acceptance or the rejection of the operation of each module of the electromagnetic flow meter including the magnetic circuit block.

What is claimed is:

1. A system of verifying an operation of an electromagnetic flow meter, comprising:
 a plurality of comparing modules configured to compare a plurality of parameters respectively obtained from modules of the electromagnetic flow meter with threshold values respectively, to output compared results; and
 a determining module configured to determine in real time an operation state of at least one of a block of an exciting block, a magnetic circuit block, and a flow rate calculating block, in the electromagnetic flow meter based on at least one of the compared results output from the plurality of comparing modules,
 wherein the determining module is configured to determine in real time the operation state of the block in the electromagnetic flow meter based on a combination of the compared results output from the plurality of comparing modules.

2. The system of verifying an operation of an electromagnetic flow meter according to claim 1, wherein the plurality of parameters include a zero adjustment value, an electrode potential, an electrode wetted portion resistance value, an exciting current value and an integrated value.

3. The system of verifying an operation of an electromagnetic flow meter according to claim 1, wherein the block includes any of an exciting block, a magnetic circuit block and a calculating process block.

4. The system of verifying an operation of an electromagnetic flow meter according to claim 1, wherein the electromagnetic flow meter is a double frequency excitation system.

5. The system of verifying an operation of an electromagnetic flow meter according to claim 1, comprising an operation verification tool,
 wherein the operation verification tool comprises:
  the plurality of comparing modules,
  the determining module, and
  an external connector configured to connect the operation verification tool to the electromagnetic flow meter.

6. The system of verifying an operation of an electromagnetic flow meter according to claim 1, comprising an operation verification tool,
 wherein the operation verification tool comprises:
  the plurality of comparing modules,
  the determining module, and
  a wireless communication module configured to connect the operation verification tool to the electromagnetic flow meter.

7. An operational status verification apparatus configured to check for malfunctioning in an operational state of an electromagnetic flow meter, comprising:
 a plurality of comparing modules configured to compare a plurality of parameters respectively obtained from modules of the electromagnetic flow meter with threshold values for proper functionality respectively, to output compared results; and
 a determining module configured to determine in real time a malfunctioning operational state of at least one of a block of an exciting block, a magnetic circuit block, and a flow rate calculating block, in the electromagnetic flow meter based on a combination of the compared results output from the plurality of comparing modules.

* * * * *